J. H. HAMMOND, Jr.
RADIODYNAMIC OCCULTING SYSTEM.
APPLICATION FILED AUG. 1, 1913. RENEWED MAR. 19, 1919.
1,419,377.   Patented June 13, 1922.
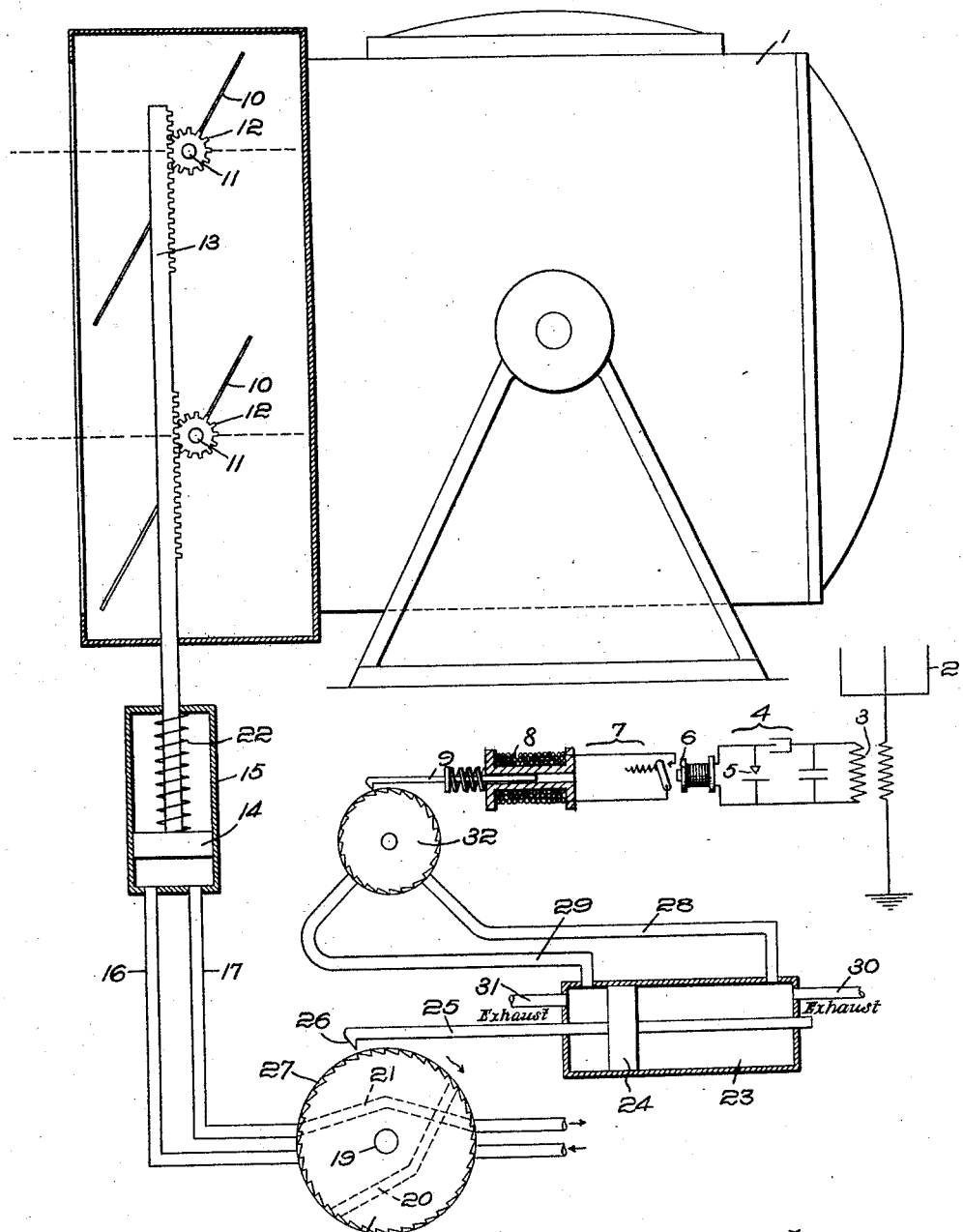
Witnesses:
Inventor:
John Hays Hammond, Jr.
by Emery, Booth, Janney and Varney
Attys.

UNITED STATES PATENT OFFICE.

JOHN HAYS HAMMOND, JR., OF GLOUCESTER, MASSACHUSETTS.

RADIODYNAMIC OCCULTING SYSTEM.

1,419,377.  Specification of Letters Patent.  Patented June 13, 1922.

Application filed August 1, 1913, Serial No. 782,416. Renewed March 19, 1919. Serial No. 283,664.

*To all whom it may concern:*

Be it known that I, JOHN HAYS HAMMOND, Jr., a citizen of the United States, and a resident of Gloucester, in the county of Essex and State of Massachusetts, have invented an Improvement in Radiodynamic Occulting Systems, of which the following description, in connection with the accompanying drawings, is a specification, like characters on the drawings representing like parts.

This invention relates to a system and mechanism for varying the path of artificial light emissions, by radiant energy from a distance.

In order that the principle of the invention may be readily understood, I have disclosed a single embodiment thereof in the accompanying drawing, wherein I have diagrammatically represented a system by which the emissions from a suitable source of artificial light may be varied.

I provide a suitable source of artificial light, herein diagrammatically indicated at 1, and which may be and preferably is a search light of any suitable type. Preferably the search light is provided with a reflecting or other surface for directing the beams of light, such for example as a parabolic reflector. The search light may be mounted upon any stationary body or, if desired, may be mounted upon a vessel to be propelled in any suitable manner and guided, if desired, by electromagnetic or Hertzian waves transmitted from some suitable sending station.

In accordance with my invention, I contemplate varying the path of the emissions from the search light or other source of artificial light, for any desired purpose, and particularly in order to conceal the source of light from the enemy. If the search light be mounted upon a vessel which is to be propelled toward the enemy it is of prime importance that means be provided to vary the path of the light emissions so that they may be deviated from the enemy. While I may vary the path of the light emissions in any suitable manner, I preferably do so by wholly or partially intercepting said emissions, and in that type of my invention herein set forth I have provided radiodynamic mechanism for occulting such light emissions so that for any desired length of time the search light cannot be detected by reason of its own beams. I thus avoid the necessity of extinguishing the light, while effectively concealing the source thereof, and the vessel or other object by which it is carried or upon which it is supported.

In suitable relation to the search light or other source of artificial light, and upon the vessel if the search light be mounted thereon, I provide an open oscillatory receiving circuit 2, responsive to wave emissions from a distant sending station, and which is connected to the winding 3 of a closed oscillatory circuit 4 having therein a suitable detector of electrical oscillations 5. The said closed oscillatory circuit may be of any suitable type and is herein represented as provided with a sensitive relay 6 or other contact making device. The relay 6 controls a suitable circuit 7 having therein a solenoid 8 controlling a plunger 9. I desire it to be understood that any suitable means operated through the instrumentality of the closed oscillatory circuit, or through the instrumentality of the receiving circuit 2, may be employed to operate the occulting means. Preferably, however, I employ a solenoid, and between the same and the occulting means I provide suitable connections which I have herein represented as fluid operated.

The occulting means may be of any suitable type. Herein I have represented for the purpose a plurality of shutters 10, 10 which may be of some suitable material, preferably opaque or partially opaque, and which are mounted upon suitable pivots 11 and are there provided with pinions 12 meshing with a preferably vertical rack 13 connected to or forming the plunger of a piston 14, mounted in a suitable cylinder 15 into which air under pressure, or other suitable fluid, is periodically introduced for the purpose of operating the piston and from which it is periodically discharged.

Herein for the purpose I have represented a compressed air inlet passage 16, leading to the bottom of the cylinder 15 from a suitable reservoir (not shown) wherein the air or other fluid may be maintained under pressure, and a passage 17 leading to some suitable point of discharge. Controlling the flow of fluid through said passages 16, 17, I provide any suitable mechanism, herein typified as a rotary valve member 18, pivoted at 19 in any suitable manner and having extending therethrough two passages 20 and 21, which are adapted to be brought periodically into communication respectively with the passages 16, 17. When the passage 20 is in communication with the passage 16, the fluid under pressure is admitted into the cylinder 15 beneath the piston 14 and lifts the same against the stress of the coil spring 22, thereby turning the shutters 10 from the closed position into substantially horizontal position, thereby to permit the emission of the beams of light. When, however, the passage 21 is brought into register with the exhaust passage 17, the spring 22 is permitted to expand, thus moving the piston 14 downwardly and returning the shutters 10 to closed position. The said shutters are herein represented as in a nearly closed position, the passage 21 being still in register with the exhaust passage 17.

While any suitable means intermediate the plunger 9 and valve 18 may be employed to operate the latter, I have herein represented a cylinder 23 having mounted therein a piston 24, the plunger 25 whereof is provided at its outer end with a pawl formation 26 adapted to engage ratchet teeth 27 upon the valve 18 so as to rotate the latter step by step in a clockwise direction.

The cylinder 23 is connected by inlet passages 28, 29 with some suitable reservoir for compressed fluid, preferably air, and which may be the reservoir previously referred to. The passages 28, 29 communicate with the cylinder 23 at opposite sides of the piston 24, and also communicating with the said cylinder at opposite sides of the piston I provide suitable exhaust passages 30, 31 which may lead to any desired point.

The fluid flow through the passages 28, 29 is controlled in any suitable manner, as by a suitable rotary valve 32, not herein necessary fully to disclose and which is adapted to be operated by the solenoid 9.

Assuming the shutters 10 to be in the position indicated or in a fully closed position and the beam to be thereby wholly or nearly obstructed or occulted, if the distant operator wishes to open the shutters a suitable number of wave impulses are transmitted and are received by the open oscillatory circuit 2 and through the instrumentality of the closed oscillatory circuit 4 the solenoid 9 is reciprocated to admit fluid pressure through the passage 29, thereby to drive the piston 24 toward the right viewing the drawing, thus bringing the passage 20 of the valve 18 into register with the passage 16 and admitting fluid pressure beneath the piston 14 so as to elevate the latter and turn the shutters upon their pivots into their open position. When it is desired to restore the shutters 10 from their open to their closed position a further emission of wave impulses from the control station rotates in the manner described the valve 18 still further in a clockwise direction so as to bring the passage 21 into register with the passage 17.

It will be understood that the piston 24 may be moved toward the left, viewing the drawing, (to place the pawl formation 26 in operative position) by the admission of fluid through the passage 28, which is effected by the suitable rotation of the valve 32 by means of the solenoid 9.

From the foregoing description it will be evident that without extinguishing or affecting the source of light, the beam or emission therefrom may be varied, and preferably by occulting the same, so as effectively to conceal the source of light and the vessel or other object by which it is carried or supported.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A system for utilizing radiant energy, including in combination, a source of artificial light, occulting means therefor, a fluid operated piston operatively connected to said occulting means, a second fluid operated piston for controlling the operation of the first piston, and means for controlling the operation of the second piston by radiant energy from a distance.

2. A system for utilizing radiant energy, including in combination, a search light having a swinging shutter, compressed air means for operating said shutter in one direction and permitting its operation in the opposite direction, a rotary valve controlling the admission and discharge of the compressed air, a reciprocatory means for operating said rotary valve, and means responsive to radiant energy transmitted from a distance to impart movement to said reciprocatory means.

3. A system for utilizing radiant energy, including in combination, a search light having a swinging shutter, compressed air means for operating said shutter in one direction and permitting its operation in the opposite direction, a rotary valve controlling the admission and discharge of the compressed air, reciprocatory means for operating said rotary valve, a rotary valve for operating said reciprocatory means, and means responsive to radiant energy transmitted from a distance to impart movement to said reciprocatory means.

4. A system for utilizing radiant energy, including in combination, a search light having a swinging shutter, compressed air means for operating said shutter in one direction and permitting its operation in the opposite direction, a rotary valve controlling the admission and discharge of the compressed air, reciprocatory means for operating said rotary valve, a rotary valve for operating said reciprocatory means, and means for operating said second valve from a distant controlled station.

In testimony whereof, I have signed my name to this specification, in the presence of two subscribing witnesses.

JOHN HAYS HAMMOND, Jr.

Witnesses:
L. BELLE TARR,
JOHN CUNNINGHAM.